United States Patent
Wu

(10) Patent No.: US 8,113,668 B2
(45) Date of Patent: Feb. 14, 2012

(54) EXTENDABLE REAL OBJECT PROJECTOR

(75) Inventor: Cheng-Cheng Wu, Sindian (TW)

(73) Assignee: Dexin Corporation, Taipei Hsien (TW)

( * ) Notice: Subject to any disclaimer, the term of this patent is extended or adjusted under 35 U.S.C. 154(b) by 414 days.

(21) Appl. No.: 12/382,515

(22) Filed: Mar. 18, 2009

(65) Prior Publication Data

US 2010/0237214 A1  Sep. 23, 2010

(51) Int. Cl.
- *G03B 21/00* (2006.01)
- *G03B 17/00* (2006.01)
- *G02F 1/1335* (2006.01)
- *E06B 11/00* (2006.01)
- *E05D 15/22* (2006.01)

(52) U.S. Cl. ............ 353/119; 353/122; 349/6; 49/158; 49/189; 396/425; 396/428

(58) Field of Classification Search .......... 353/122, 353/119; 348/370, 258; 349/6; 49/158, 49/160, 189; 396/419, 425, 428
See application file for complete search history.

(56) References Cited

U.S. PATENT DOCUMENTS

| | | | | |
|---|---|---|---|---|
| 4,811,110 A * | 3/1989 | Ohmura et al. | | 358/400 |
| 5,339,173 A * | 8/1994 | Jinnai | | 358/471 |
| 6,065,839 A | 5/2000 | Miyata et al. | | |
| 6,300,975 B1 * | 10/2001 | Yamane | | 348/63 |
| D542,795 S * | 5/2007 | Sukenari et al. | | D14/423 |
| 7,845,807 B2 * | 12/2010 | Iwasaki | | 353/94 |
| 2008/0136915 A1 * | 6/2008 | Iwamura | | 348/159 |

\* cited by examiner

*Primary Examiner* — Georgia Y Epps
*Assistant Examiner* — Magda Cruz
(74) *Attorney, Agent, or Firm* — Rosenberg, Klein & Lee

(57) ABSTRACT

A portable material exhibiting apparatus comprises a base assembly having a pivoting base, the pivoting base being disposed on one side of the base assembly; a retractable rod assembly having one end pivoting to the pivoting base; and an image capturing module having one end pivoting to the other end of the retractable rod assembly. Therefore, when carrying the portable material exhibiting apparatus, the image capturing module may rotate to be parallel with the retractable rod assembly. The retractable rod assembly may shorten its length and rotate to be parallel with the base assembly. Via this arrangement, the spaced occupied by the portable material exhibiting apparatus is reduced greatly.

16 Claims, 6 Drawing Sheets

EXTENDABLE REAL OBJECT PROJECTOR

BACKGROUND OF THE INVENTION

1. Field of the Invention

The present invention relates to a extendable real object projector, in particular, to a real object projector for capturing an image of an article.

2. Description of Related Art

When people give a speech or brief, they often use a computer and a projector to show their contents to be illustrated. A user has to make the contents of the speech into an image file or document file first, so that the image file or document file can be transmitted to the projector. Then, the projector can project the contents of the image file or document file onto a screen.

However, in some cases, it is so complicated to make the contents to be illustrated into an image file or document file. For example, if a teacher intends to explain a biological structure of an organism, he/she needs to take pictures of every biological characteristics of the organism in advance and then incorporate these pictures into an image file, which takes a lot of time. Under this circumstance, a teacher may alternatively use a real article (organism) for better illustration to students. Thus, a material exhibiting apparatus is proposed.

As an example, U.S. Pat. No. 6,065,839 discloses a material exhibiting apparatus, in which an overhead camera and a base are provided. The article to be exhibited is disposed below the overhead camera. Then, the overhead camera captures the image of the article, and transmits the captured image to a projector. Thus, the projector can project the image to a screen. Via this arrangement, once an article is disposed below the overhead camera, its image can be captured by the camera and projected to a screen in an enlarged scale, so that people can view the image of the article more clearly.

However, the material exhibiting apparatus is usually bulky, so that the user cannot carry it conveniently. Thus, the material exhibiting apparatus is often disposed and used at a specific location.

Consequently, because of the above limitation resulting from the technical design of prior art, the inventor strives via real world experience and academic research to develop the present invention, which can effectively improve the limitations described above.

SUMMARY OF THE INVENTION

The objective of the present invention is to provide a extendable real object projector, whereby a user can carry it conveniently.

To achieve the above-mentioned objective, the present invention provides a extendable real object projector, which includes a base assembly having a pivoting base, the pivoting base being disposed on one side of the base assembly; a retractable rod assembly having one end pivoting to the pivoting base; and an image capturing module having one end pivoting to the other end of the retractable rod assembly.

The present invention further provides a extendable real object projector, which includes a base assembly having a pivoting base, the pivoting base being disposed on one side of the base assembly; a retractable rod assembly having one end pivoting to the pivoting base, the length of the retractable rod assembly being adjusted in a multiple-step manner or a stepless manner; and an image capturing module having one end pivoting to the other end of the retractable rod assembly, the image capturing module having a camera, a wireless transmission antenna, and a battery set, the camera being detachably inserted in one end of the image capturing module; wherein the camera is for capturing an image of an article, the wireless transmission antenna is for transmitting the image of the article, the battery set is for providing electricity for the camera.

The present invention has advantageous features as follows. When a user intends to carry the extendable real object projector, or called material exhibiting apparatus hereafter, of the present invention, the user rotates the image capturing module to be parallel with the retractable rod assembly. Then, the user shortens the length of the retractable rod assembly to the minimum. Finally, the user rotates the image capturing module and the retractable rod assembly to be parallel to the base assembly. In this way, the space occupied by the portable exhibiting apparatus can be reduced greatly, so that the user can carry it conveniently.

In order to further understand the techniques, means, and effects the present invention takes for achieving the prescribed objectives, the following detailed descriptions and appended drawings are hereby referred; such that, through which, the purposes, features, and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
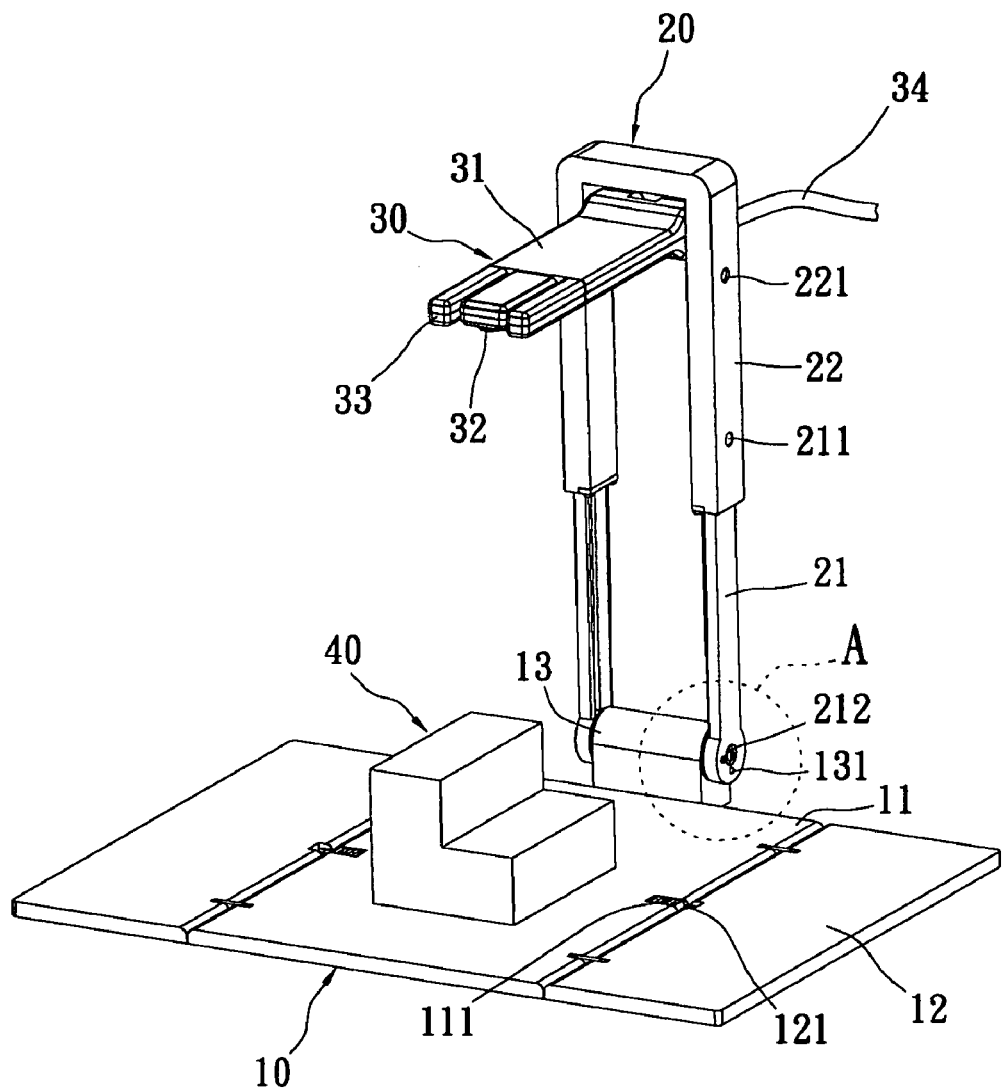
FIG. 1 is a perspective view showing a portable material exhibiting apparatus according to the present invention.
Figure 1A:
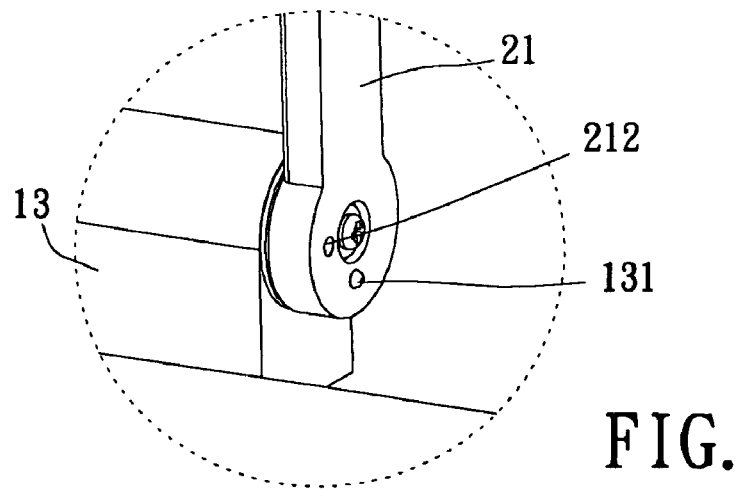
FIG. 1A is an enlarged view showing a rotating rod and a pivoting base according to the present invention.
Figure 2:
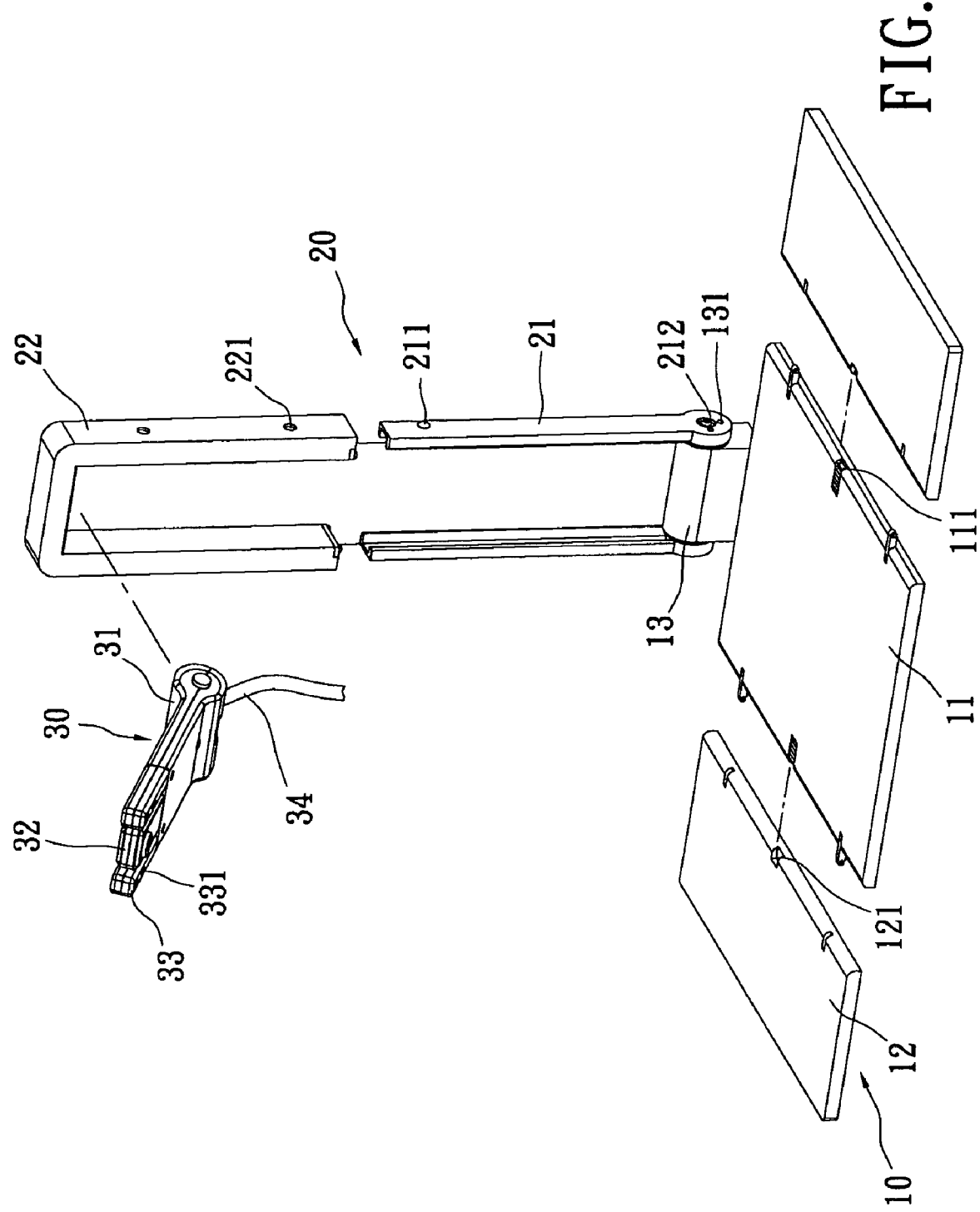
FIG. 2 is an exploded perspective view showing the portable material exhibiting apparatus according to the present invention.
Figure 3:
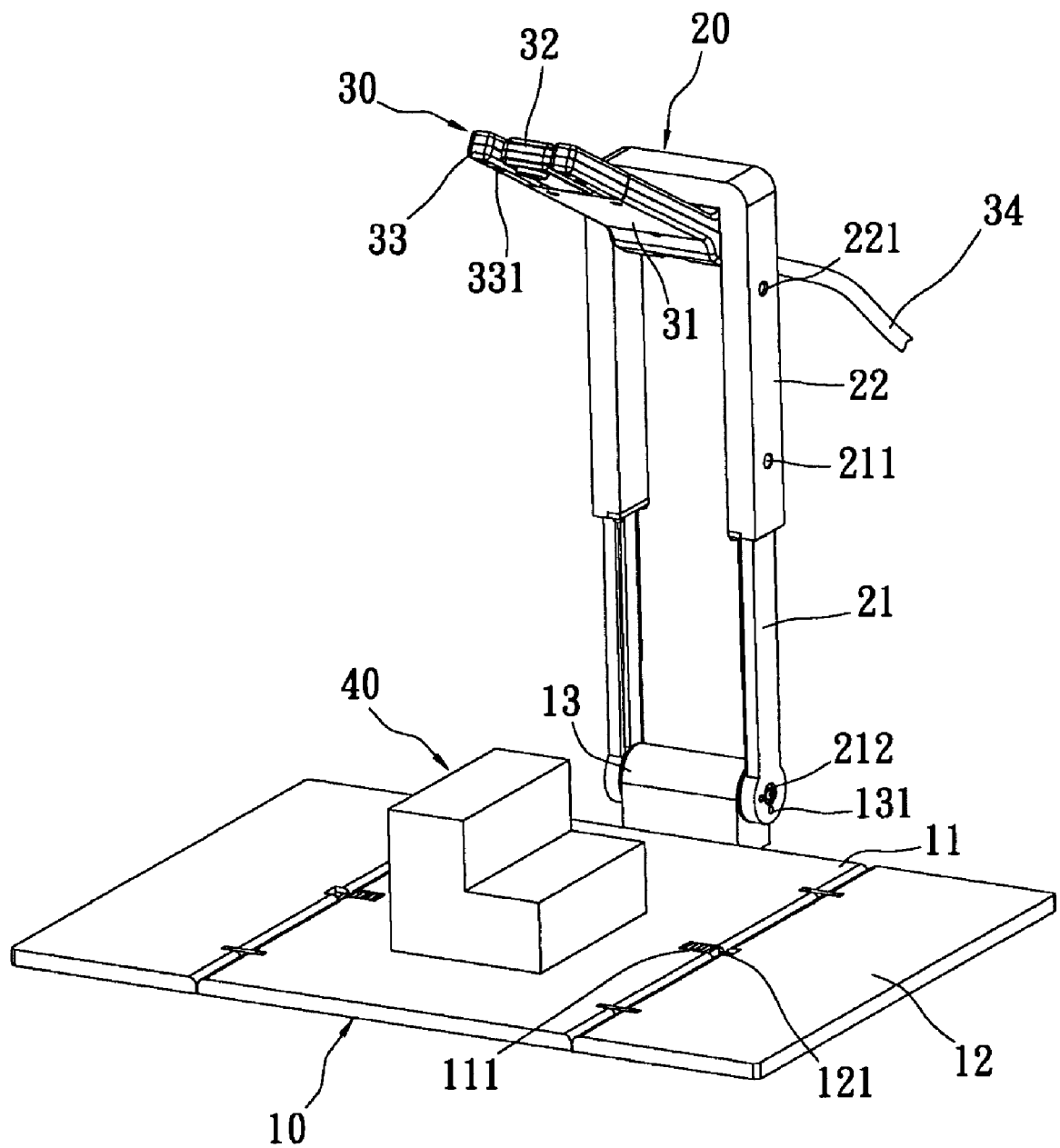
FIG. 3 is another perspective view showing the portable material exhibiting apparatus according to the present invention.

Referring now to FIGS. 1 to 3. The present invention provides an embodiment of a portable material exhibiting apparatus. The portable material exhibiting apparatus includes a base assembly 10, a retractable rod assembly 20 and, an image capturing module 30.

The base assembly 10 is used to support the retractable rod assembly 20 and the image capturing module 30. An article 40 whose image is to be captured is disposed on the base assembly 10. The base assembly 10 has a base plate 11, two wing plates 12, and a pivoting base 13.

The base plate 11 is a rectangular plate. The top surface of the base plate 11 is a horizontal surface on which the article 40 can be disposed. The two wing plates 12 are pivoted to two opposite sides, i.e. the right side and left side, of the base plate 11 respectively. The length of the two wing plates 12 (the distance from its front side to its rear side) is identical to that of the bottom plate 11, but the width of the base plate (the distance from its left side to its right side) is shorter than that of the base plate 11. In the present embodiment, the width of the wing plate 12 is substantially one half of the width of the base plate 11.

In the present embodiment, the dimensions of the base plate 11 and the wing plate 12 are described as follows. The lengths of the base plate 11 and the wing plate 12 are 210 mm respectively, the width of the base plate 11 is 150 mm, and the width of the wing plate 12 is 74 mm. Therefore, the sum of area of the top surfaces of the base plate 11 and the two wing plates 12 (210 m×298 mm) is substantially identical to the area of an international standard "A4"-sized paper (210 mm×297 mm).

Figure 6:
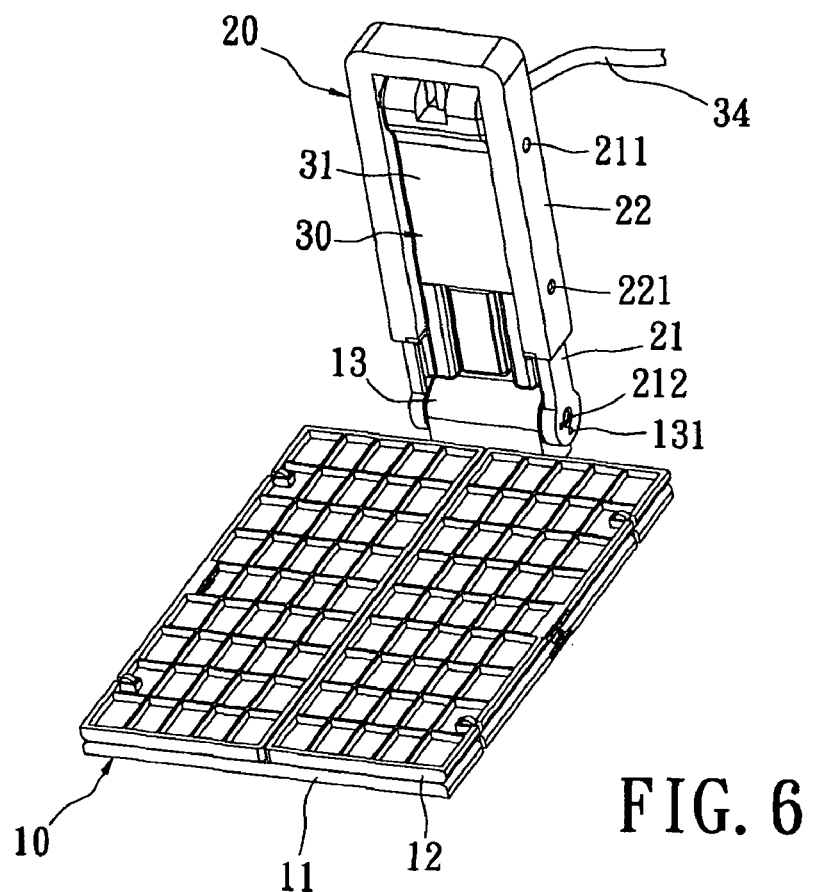
FIG. 6 is another perspective view showing the portable material exhibiting apparatus according to the present invention.
Figure 7:
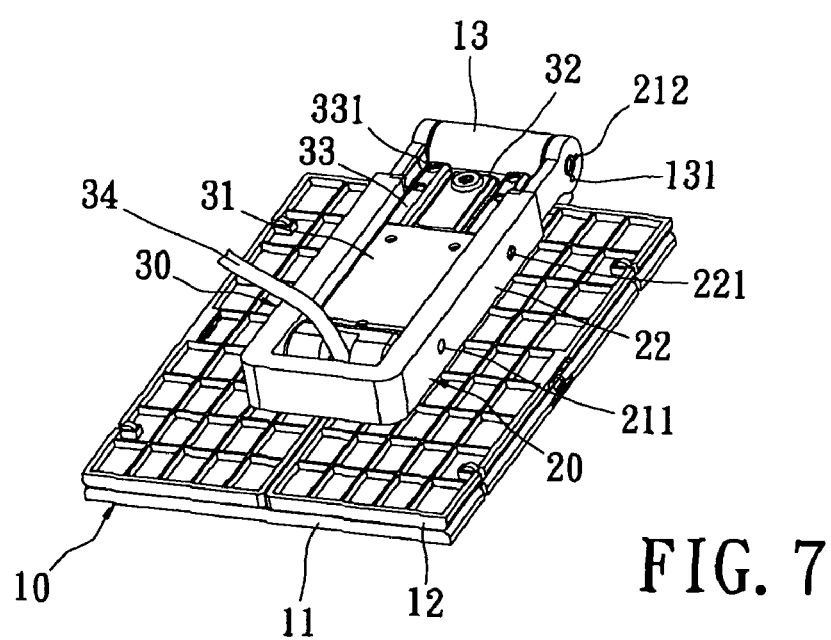
FIG. 7 is another perspective view showing the portable material exhibiting apparatus according to the present invention.

Please refer to FIGS. 1 and 6. The two wing plates 12 can rotate outwards to two sides of the base plate 11, or rotate inwards onto the base plate 11. In this way, the two wing plates 12 can be disposed flatly on the top surface of the base plate 11.

The base plate 11 further has two locking elements 111. The two locking elements 111 can be slidingly disposed on two sides of the base plate 11. Each of the two wing plates 12 has an accommodating trough 121, which is recessed on one side of the wing plate 12, and the one side of the wing plate 12 is the side that pivots to the base plate 11. The location of the locking element 111 corresponds to that of the accommodating trough 121. When the two wing plates 12 rotate outwards to two sides of the base plate 11, the locking element 111 can slide outwards into the accommodating trough 121, whereby the two wing plates 12 cannot rotate freely any more. Only after the two locking elements 111 are pushed away from the two accommodating troughs 121, may the two wing plates 12 rotate on the base plate 11 again.

The pivoting base 13 is disposed on the rear side of the base plate 11 and is located in the middle portion of the base plate 11. The pivoting base 13 allows the lower end of the retractable rod assembly 20 to be connected thereto. The retractable rod assembly 20 can change its length, thereby adjusting the distance of the image capturing module 30 pivoting to the upper end of the retractable rod assembly 20 with respect to the article 40.

The retractable rod assembly 20 has two parallel rotating rods 21 and two parallel extension rods 22. The lower ends of the two rotating rods 21 are pivoted to the pivoting base 13 of the base assembly 10, and are located on both sides of the pivoting base 13. The two extension rods 22 are connected to the two rotating rods 21 in such a manner that they can slide on the two rotating rods 21. When the extension rod 22 slides toward the lower end of the rotating rod 21, the length of the retractable rod assembly 20 is reduced. On the contrary, when the extension rod 22 slides towards the upper end of the rotating rod 21, the length of the retractable rod assembly 20 is increased.

The length of the retractable rod assembly 20 can be varied in a multiple-step manner or a stepless manner. In the case for length variation of the multiple-step manner, the rotating rod 21 has a positioning element 211. The positioning element 211 is provided outside the rotating rod 21 and is a sphere-structure to be pressed. The extension rod 22 has at least two positioning holes 221 that are recessed on an outer side of the extension rod 22. When the extension rod 22 slides to a certain position, the positioning element 211 is located in one of the positioning holes 221. After the positioning element 211 is pressed to be removed from the positioning hole 221, the extension rod 22 can slide on the rotating rod 21 again.

When the positioning element 211 is located in an upper positioning hole 221, the length of the retractable rod assembly 20 is longer. On the contrary, when the positioning element 211 is located in a lower positioning hole 221, the length of the retractable rod assembly 20 is shorter. If the number of the positioning holes 221 is more numerous, the length of the retractable rod assembly 20 can be varied in more steps.

If the length of the retractable rod assembly 20 is varied in a stepless manner, the extension rod 22 and the rotating rod 21 are in a clearance fit relationship. A static frictional force exists between the extension rod 22 and the rotating rod 21, so that the extension rod 22 cannot slide on the rotating rod 21 easily. When a user intends to change the length of the retractable rod assembly 20, the user needs to exert a force larger than the static frictional force. In this way, the extension rod 22 can slide upwards or downwards to another position.

The rotation angle between the retractable rod assembly 20 and the pivoting base 13 can be varied in a multiple-step manner or a stepless manner. In the case for angle variation of the multiple-step manner, the pivoting base 13 has two further positioning elements 131. The two positioning elements 131 are provided on both sides of the pivoting base 13 respectively. The rotating rod 21 has at least two further positioning holes 212 that are recessed on an outer side of the rotating rod 21 and adjacent to the lower end of the rotating rod 21. When the rotating rod 21 rotates to a certain angle, the positioning element 131 is located in one of the positioning holes 212. Like the positioning element 211, only after the positioning element 131 is pressed, the rotating rod 21 can rotate again.

When the positioning element 131 is located in the positioning hole 212 of upper position, the retractable rod assembly 20 is perpendicular to the base plate 11. When the positioning element 131 is located in the positioning hole 212 of lower position (FIG. 5), the retractable rod assembly 20 is parallel with the base plate 11. When the number of the positioning holes 212 of the rotating rod 21 is more numerous, the rotation angle of the retractable rod assembly 20 can be varied in more steps.

When the rotation angle of the retractable rod assembly 20 is varied in the stepless manner, the rotating rod 21 and the pivoting base 13 are in a clearance fit relationship. A static frictional force exists between the rotating rod 21 and the pivoting base 13. Thus, the user has to exert a force larger than the static friction force so as to adjust the rotation angle of the retractable rod assembly 20.

The image capturing module 30 is used for capturing an image of an article 40 disposed on the base plate 11. The rear end of the image capturing module 30 is pivoted to the upper end of the retractable rod assembly 20. More specifically, the rear end of the image capturing module 30 is pivoted to the upper ends of the two extension rods 22 of the retractable rod assembly 20 and is located between the two extension rods 22 and the two rotating rods 21. The image capturing module 30 rotates together with the retractable rod assembly 20. The image capturing module 30 also further rotates with respect to the retractable rod assembly 20. When the length of the retractable rod assembly 20 is varied, the distance between the image capturing module 30 and the base plate 11 is varied accordingly.

The image capturing module 30 has a camera base 31, a camera 32, a lamp 33, and a signal transmission line 34. The rear end of the camera base 31 is pivoted to the upper end of the extension rod 22. The camera 32 is disposed on the front end of the camera base 31 for capturing the image of the article 40. The camera 32 can be fixed on the camera base 31 directly. Or, the rear end of the camera 32 is provided with a connector (not shown). The front end of the camera base 31 is provided with a docking connector (not shown). Then, the connector of the camera 32 is inserted to the docking connector of the camera base 31. In this way, when the camera 32 is not in use, it can be detached from the camera base 31 for other purposes, such as insertion to other electronic products (not shown), or separately stored.

Figure 4:
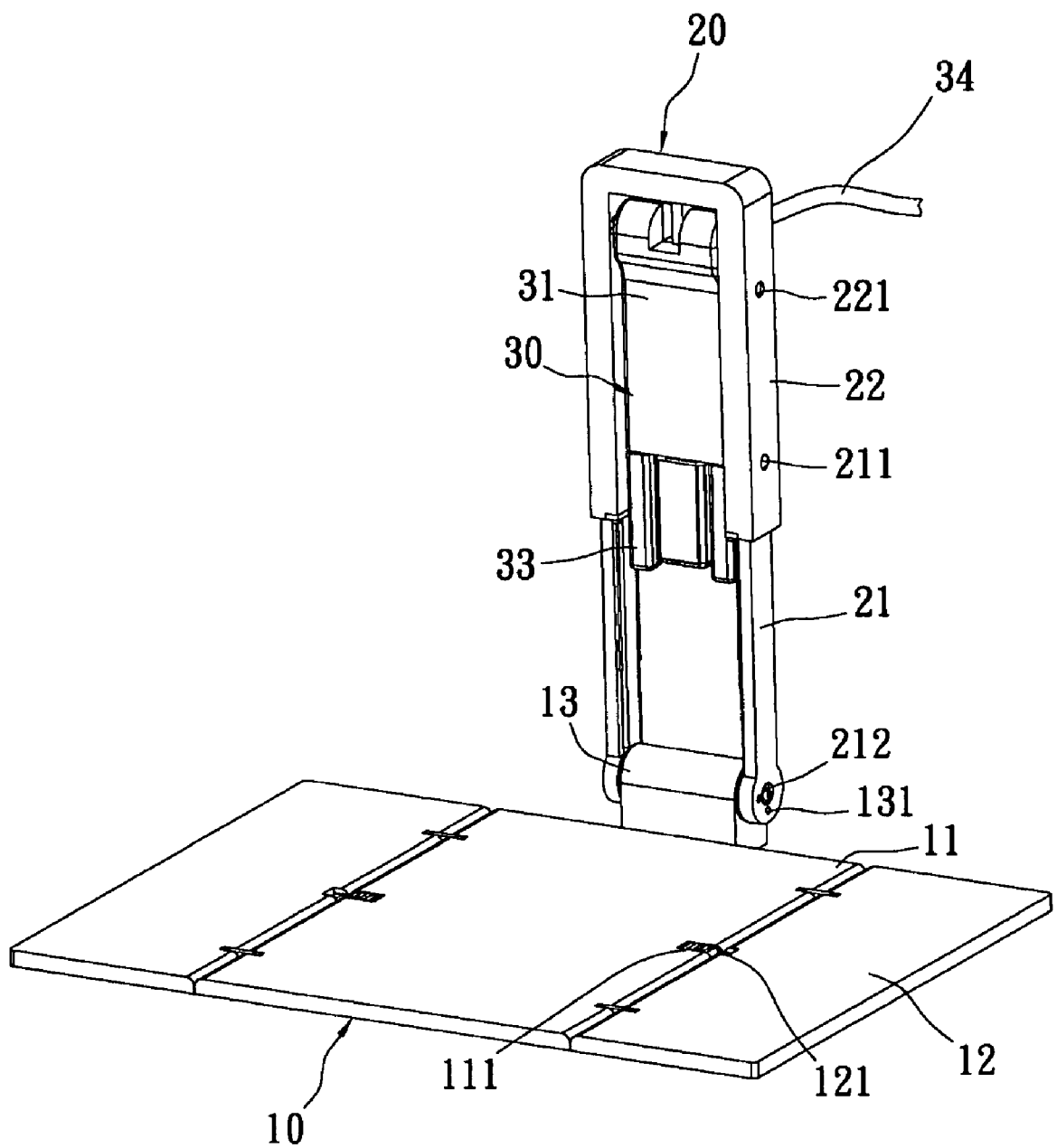
FIG. 4 is another perspective view showing the portable material exhibiting apparatus according to the present invention.

The lamp 33 is also disposed on the front end of the camera base 31 and is located adjacent to the camera 32. The lamp 33 emits light to illuminate the article 40, thereby increasing the brightness of the image captured by the camera 32. Please refer to FIGS. 3 and 4. The lamp 33 has a plurality of high-intensity light-emitting diodes 331 distributed on both sides of the camera 32. Those light-emitting diodes 331 are arranged to form a quadrangle. The camera 32 is located in the center of the quadrangle.

The signal transmission line 34 is disposed on the rear end of the camera base 31. The other end of the signal transmission line 34 can be inserted into another electronic product (not shown), such as a personal computer, a notebook computer, or a projector. The image captured by the camera 32 is transmitted to the electronic device via the signal transmission line 34. Especially when the image captured by the camera 32 is transmitted to a projector, the projector can enlarge the image of the article 40 and then project the enlarged image on a screen.

The image capturing module 30 further has a power line (not shown) for connecting to an external power source, thereby providing electricity for the camera 32 and the lamp 33.

In another embodiment, the image capturing module 30 has a wireless transmission antenna and a battery set (not shown). The wireless transmission antenna is embedded in the camera base 31, or provided on an outer surface of the camera base 31. Further, the wireless transmission antenna can be provided in the camera 32. The wireless transmission antenna transmits the image of the article 40 captured by the camera 32 to an electronic product. The battery set is embedded in the camera base 31 for providing electricity for the camera 32 and the lamp 31.

Via this arrangement, it is unnecessary for the image capturing module 30 to be equipped with a power line and the signal transmission line 34, which increases the portability of the portable material exhibiting apparatus greatly.

Please refer to FIGS. 4 to 7. When the portable material exhibiting apparatus is to be stored or carried to another place, the user can reduce the space occupied by the portable material apparatus easily. Please refer to FIGS. 1 and 4. First, the article 40 is removed from the base assembly 10. Then, the image capturing module 30 rotates downwards until the image capturing module 30 enters the retractable rod assembly 20 to be parallel with the retractable rod assembly 20. The camera 32 can be removed from the camera base 31 selectively.

Figure 5:
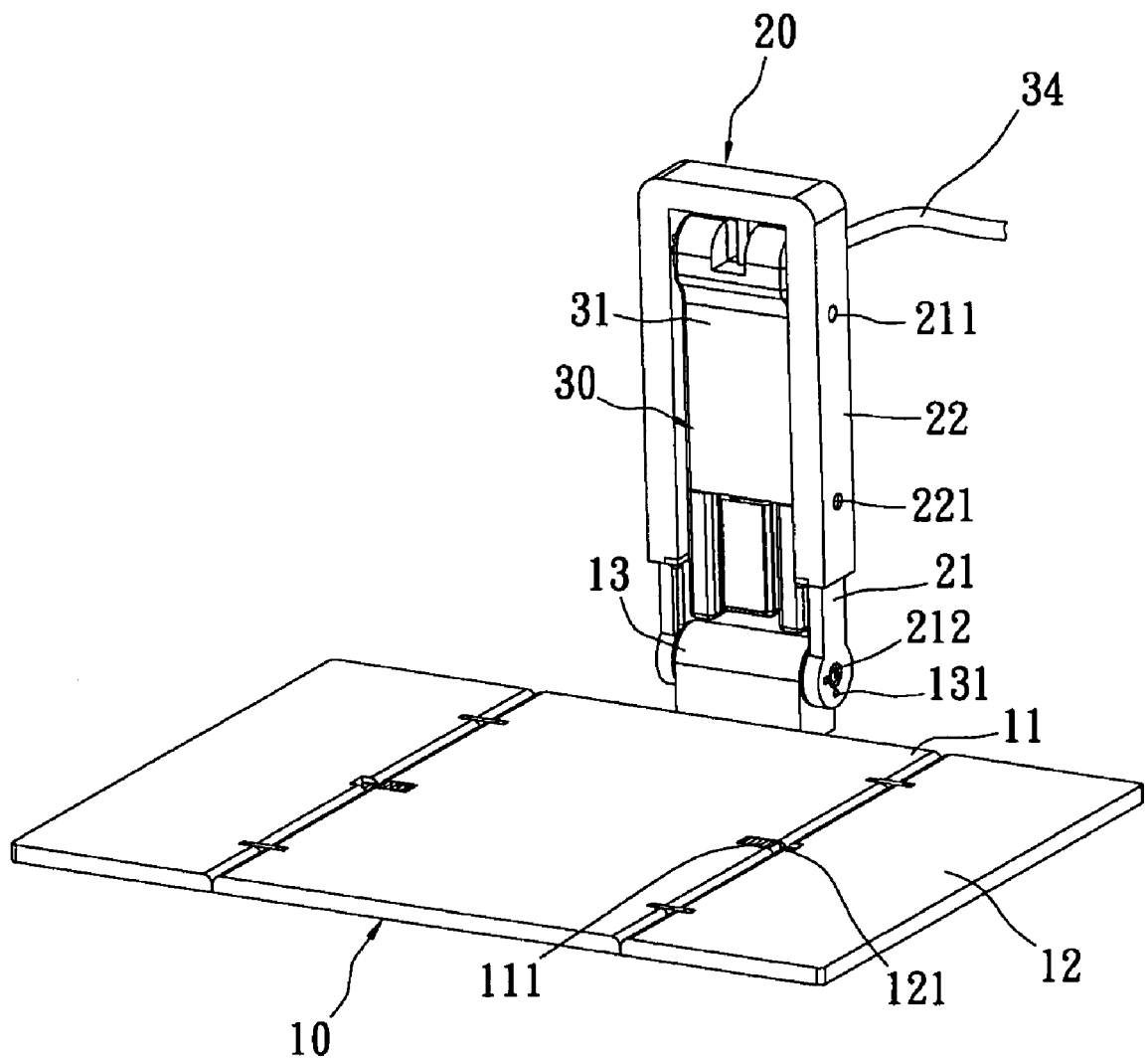
FIG. 5 is another perspective view showing the portable material exhibiting apparatus according to the present invention.

Please refer to FIGS. 5 and 6. The length of the retractable rod assembly 20 is reduced to the minimum. Then, the two wing plates 12 turn upwards and inwards to be disposed on the base plate 11, so that the width of the base assembly 10 is reduced greatly. Please refer to FIG. 7. Finally, the retractable rod assembly 20 turns forwards and downwards to be disposed on the two wing plates 12. The retractable rod assembly 20, the image capturing module 30, the two wing plates 12, and the base plate 11 are stacked up vertically. In this way, the height of the portable material apparatus is reduced greatly, so that it can be carried and stored easily.

According to the above, the portable material apparatus of the present invention has advantageous features as follows:

(1) The wing plate 12 of the base assembly 10 can rotate to be disposed on the base plate 11, thereby reducing the width of the base assembly 10 greatly;

(2) The length of the retractable rod assembly 20 can be varied to the maximum when the article 40 is exhibited and to the minimum upon its storage and transportation;

(3) The length of the retractable rod assembly 20 can be adjusted in a multiple-step manner or a stepless manner;

(4) The image capturing module 30 can rotate into the retractable rod assembly 20. The camera 32 can be removed from the image capturing module 30 and then used separately in other electronic products;

(5) The base assembly 10, the retractable rod assembly 20 and the image capturing module 30 are stacked up vertically, so that the height of the portable material exhibiting apparatus can be reduced greatly; and (6) The image capturing module 30 has a wireless transmission antenna and a battery set, so that the portable material exhibiting apparatus can be carried more easily.

The above-mentioned descriptions represent merely the preferred embodiment of the present invention, without any intention to limit the scope of the present invention thereto. Various equivalent changes, alternations, or modifications based on the claims of present invention are all consequently viewed as being embraced by the scope of the present invention.

What is claimed is:

1. A extendable real object projector, comprising:
a base assembly having a pivoting base, the pivoting base being disposed on one side of the base assembly; wherein the base assembly has a base plate and two wing plates, the two wing plates are pivoted to two sides of the base plate respectively, the pivoting base is provided on one side of the base plate;
a retractable rod assembly having one end pivoting to the pivoting base; and
an image capturing module having one end pivoting to the other end of the retractable rod assembly.

2. The extendable real object projector according to claim 1, wherein the base assembly has two locking elements slidingly provided on two sides of the base plate respectively, the two wing plates have an accommodating trough respectively, the accommodating trough is provided on one side of the wing plate, the locking element slides outwards to enter the accommodating trough.

3. The extendable real object projector according to claim 1, wherein the sum of the area of the top surfaces of the base plate and the two wing plates is substantially identical to the area of an internal standard "A4"-sized paper.

4. The extendable real object projector according to claim 1, wherein the retractable rod assembly has two parallel rotating rods and two parallel extension rods, one end of each of the two rotating rods is pivoted to the pivoting base, the two extension rods are slidingly disposed on the two rotating rods respectively, one end of the image capturing module is pivoted to the two extension rods and is located between the two extension rods.

5. The extendable real object projector according to claim 4, wherein the rotating rod has a positioning element disposed on one side of the rotating rod, the extension rod has at least two positioning holes recessed on one side of the extension rod, the positioning element is located in one of the positioning holes.

6. The extendable real object projector according to claim 4, wherein the pivoting base has at least one positioning element disposed on one side of the pivoting base, the rotating rod has at least two positioning holes recessed on one side of the rotating rod, the positioning element is located in one of the positioning holes.

7. The extendable real object projector according to claim 1, wherein the image capturing module has a camera base and a camera, one end of the camera base is pivoted to the other end of the retractable rod assembly, the camera is disposed on the other end of the camera base.

8. The extendable real object projector according to claim 7, wherein the camera is inserted in the other end of the camera base.

9. The extendable real object projector according to claim 7, wherein the image capturing module has a lamp provided on one end of the camera base.

10. The extendable real object projector according to claim 9, wherein the lamp has a plurality of light-emitting diodes located adjacent to both sides of the camera.

11. The extendable real object projector according to claim 7, wherein the image capturing module has a signal transmission line provided on one end of the camera base.

12. The extendable real object projector according to claim 7, wherein one end of the signal transmission line is inserted into a personal computer, a notebook computer, or a projector.

13. The extendable real object projector according to claim 7, wherein the image capturing module has a signal transmission antenna.

14. The extendable real object projector according to claim 7, wherein the image capturing module has a battery set for providing electricity for the camera.

15. A extendable real object projector, comprising:
a base assembly having a pivoting base, the pivoting base being disposed on one side of the base assembly;
a retractable rod assembly having one end pivoting to the pivoting base, the length of the retractable rod assembly being adjusted in a multiple-step manner or a stepless manner; and
an image capturing module having one end pivoting to the other end of the retractable rod assembly, the image capturing module having a camera, a wireless transmission antenna, and a battery set, the camera being detachably inserted in one end of the image capturing module;
wherein the camera is for capturing an image of an article, the wireless transmission antenna is for transmitting the image of the article, the battery set is for providing electricity for the camera.

16. A extendable real object projector, comprising:
a base assembly having a pivoting base, the pivoting base being disposed on one side of the base assembly;
a retractable rod assembly having one end pivoting to the pivoting base; and
an image capturing module having one end pivoting to the other end of the retractable rod assembly; wherein the retractable rod assembly has two parallel rotating rods and two parallel extension rods, one end of each of the two rotating rods is pivoted to the pivoting base, the two extension rods are slidingly disposed on the two rotating rods respectively, one end of the image capturing module is pivoted to the two extension rods and is located between the two extension rods.

* * * * *